(12) United States Patent
Ilao, Jr. et al.

(10) Patent No.: US 9,028,561 B2
(45) Date of Patent: May 12, 2015

(54) BLUING COMPOSITION AND METHOD FOR TREATING TEXTILE ARTICLES USING THE SAME

(75) Inventors: Carlos Ilao, Jr., Singapore (SG); Kheng Teck Chan, Singapore (SG); Rajnish Batlaw, Spartanburg, SC (US); Zhen Zhen Lim, Singapore (SG)

(73) Assignee: Milliken & Company, Spartanburg, SC (US)

( * ) Notice: Subject to any disclaimer, the term of this patent is extended or adjusted under 35 U.S.C. 154(b) by 144 days.

(21) Appl. No.: 12/711,844

(22) Filed: Feb. 24, 2010

(65) Prior Publication Data

US 2010/0281628 A1 Nov. 11, 2010

Related U.S. Application Data

(60) Provisional application No. 61/175,631, filed on May 5, 2009.

(51) Int. Cl.
| | |
|---|---|
| *C11D 3/40* | (2006.01) |
| *C11D 3/42* | (2006.01) |
| *D06L 3/12* | (2006.01) |
| *D06L 3/16* | (2006.01) |
| *C09B 69/00* | (2006.01) |
| *C09B 69/10* | (2006.01) |

(52) U.S. Cl.
CPC .. *C11D 3/40* (2013.01); *C11D 3/42* (2013.01); *C09B 69/00* (2013.01); *C09B 69/103* (2013.01)

(58) Field of Classification Search
CPC .......... C09B 1/00; C09B 11/04; C09B 11/10; C09B 69/00; C09B 69/103; C11D 3/40; C11D 3/42; C11D 7/00
USPC .............. 8/648, 657, 636, 638, 137; 510/276, 510/343, 373, 419, 324
See application file for complete search history.

(56) References Cited

U.S. PATENT DOCUMENTS

| | | | | |
|---|---|---|---|---|
| 2,598,660 | A | * | 6/1952 | Glickman ...................... 552/109 |
| 4,812,141 | A | | 3/1989 | Baumgartner et al. |
| 4,877,411 | A | | 10/1989 | Hines et al. |
| 5,549,852 | A | * | 8/1996 | Bell .............................. 510/299 |
| 7,018,977 | B2 | | 3/2006 | Martens et al. |
| 7,208,459 | B2 | | 4/2007 | Sadlowski et al. |
| 7,235,518 | B2 | | 6/2007 | Brush et al. |
| 2002/0004474 | A1 | * | 1/2002 | Price ............................. 510/375 |
| 2005/0202990 | A1 | * | 9/2005 | Caswell et al. ............... 510/295 |
| 2006/0105927 | A1 | | 5/2006 | Stephens et al. |
| 2007/0211126 | A1 | * | 9/2007 | Bauer et al. ................... 347/100 |
| 2008/0196177 | A1 | * | 8/2008 | Moore et al. ...................... 8/506 |

FOREIGN PATENT DOCUMENTS

| | | |
|---|---|---|
| EP | 0 108 180 A1 | 11/1982 |
| EP | 1 975 226 A1 | 10/2008 |
| GB | 1 339 619 | 12/1973 |
| WO | WO 2005/068596 A1 | 7/2005 |
| WO | WO 2008/063374 A2 | 5/2008 |

OTHER PUBLICATIONS

International Search Report and the Written Opinion of the International Searching Authority for PCT/US2010/000551.

* cited by examiner

*Primary Examiner* — Amina Khan
(74) *Attorney, Agent, or Firm* — Robert M. Lanning

(57) ABSTRACT

A bluing composition concentrate comprises an aqueous medium and at least one colorant that exhibits a blue or violet shade when deposited onto a textile material. The concentrate can be used to produce a bluing composition, and the bluing composition can be used to treat textile materials in such a way as to decrease the visually-perceived yellow coloration of textile articles that can occur with repeated use and laundering.

16 Claims, No Drawings

BLUING COMPOSITION AND METHOD FOR TREATING TEXTILE ARTICLES USING THE SAME

CROSS-REFERENCE TO RELATED APPLICATIONS

This application claims, pursuant to 35 U.S.C. §119(e), the benefit of the filing date of U.S. Patent Application No. 61/175,631, which was filed on May 5, 2009.

TECHNICAL FIELD OF THE INVENTION

The invention relates to concentrates and compositions suitable for use in treating textile articles to decrease the visually-perceived yellow coloration that can occur with repeated use and laundering of such textile articles. In particular, the invention provides a bluing composition concentrate and bluing composition containing certain blue or violet colorants that can effectively decrease this yellow coloration without excessive build-up on the treated article and without excessive staining.

BRIEF SUMMARY OF THE INVENTION

As noted above, the invention generally provides a bluing composition concentrate and bluing composition containing certain blue or violet colorants. The colorant(s) are selected to provide a shade of blue or violet that can effectively decrease the visually-perceived yellow coloration of textile articles that can occur with repeated use and laundering. The colorant(s) also exhibit solubility and deposition characteristics that allow the colorant(s) to be delivered to the textile articles via an aqueous treatment (e.g., a post-wash rinse) and to deposit on the textile articles in an amount sufficient to decrease the yellow coloration without excessive build-up developing with successive treatments (e.g., build-up of the colorant to such a degree that the textile article appears excessively blue).

In a first embodiment, the invention provides a bluing composition concentrate comprising an aqueous medium and at least one colorant conforming to the structure of Formula (I) below:

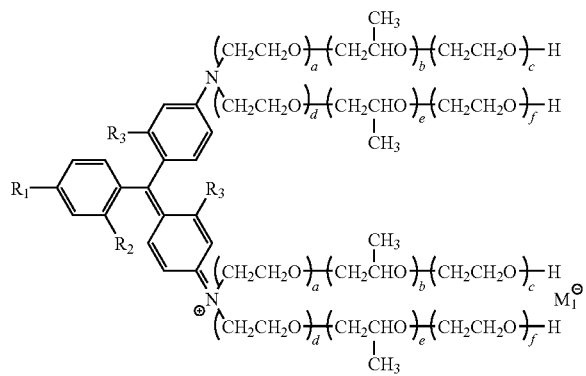

In Formula (I), $R_1$ can be hydrogen or an alkylamine group; $R_2$ can be hydrogen or sodium sulfonate; and $R_3$ can be hydrogen or an alkyl group. The sum of a and d can be from about 2 to about 20; the sum of b and e can be from about 0 to about 20; the sum of c and f can be from about 0 to about 20; and the sum of a, b, c, d, e, and f can be from about 4 to about 30. $M_1$ can be a negatively-charged counterion.

The bluing composition concentrate described above is particularly well-suited for addition to aqueous media to produce a bluing composition. This bluing composition is particularly well-suited for use as a post-wash treatment or rinse for laundered textile articles. When used in such a way, the colorant(s) are deposited onto the textile article via this post-wash rinse and impart the desired shade to counteract the visually-perceived yellow coloration of the textile articles.

Thus, in another embodiment, the invention provides a method for treating textile articles and decreasing the visually-perceived yellow coloration of such textile articles. The method generally comprises the steps of: providing one or more textile articles; providing a bluing composition comprising an aqueous medium and at least one colorant conforming to the structure of Formula (I); immersing the textile article in the bluing composition for an amount of time sufficient for the textile article to absorb at least a portion of the bluing composition; removing the textile article from the bluing composition; and drying the textile article. The bluing composition utilized in the method can be made by adding an appropriate amount of the above-described bluing composition concentrate to an aqueous medium.

DETAILED DESCRIPTION OF THE INVENTION

In a first embodiment, the invention provides a bluing composition concentrate comprising an aqueous medium and at least one colorant conforming to a specified structure. The aqueous medium can be any suitable aqueous medium. For example, the aqueous medium can comprise purified water, distilled water, or deionized water. Also, the aqueous medium can contain an acid, base, or combination of the two as is necessary to adjust the pH to a level at which the colorant(s) remain stable for the shelf-life of the concentrate.

As noted above, the bluing composition concentrate comprises at least one colorant (a "primary colorant") that exhibits a blue or violet shade when deposited on a textile article. The blue or violet shade helps to mask or decrease the visually-perceived yellow coloration of the textile article that can result from repeated use and laundering. The primary colorant preferably exhibits an absorption spectrum having a $\lambda_{max}$ between about 560 nm and about 620 nm. The primary colorant also exhibits solubility and deposition characteristics that allow the colorant to be deposited onto the textile articles via an aqueous treatment (e.g., a post-wash rinse) in an amount sufficient to decrease the yellow coloration without developing excessive build-up with successive treatments (e.g., build-up of the primary colorant to such a degree that the textile article appears excessively blue).

In certain embodiments of the bluing composition concentrate, the concentrate comprises at least one primary colorant conforming to the structure of Formula (I):

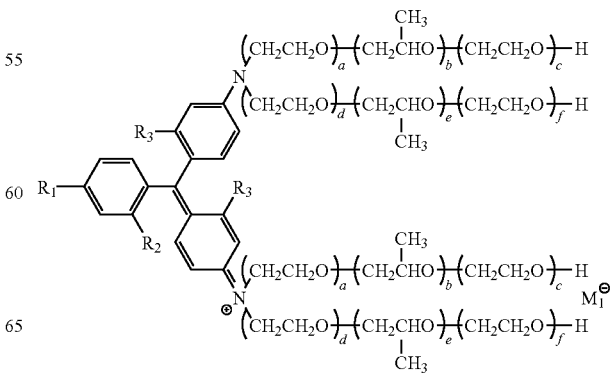

In Formula (I), $R_1$ can be hydrogen or an alkylamine group; $R_2$ can be hydrogen or sodium sulfonate; and $R_3$ can be hydrogen or an alkyl group. The sum of a and d can be from about 2 to about 20; the sum of b and e can be from about 0 to about 20; the sum of c and f can be from about 0 to about 20; and the sum of a, b, c, d, e, and f can be from about 4 to about 30. $M_1$ can be a negatively-charged counterion, such as a chloride anion or a sulfate anion. In certain more specific embodiments, $R_1$ can be an alkylamine group; $R_2$ and $R_3$ can be hydrogen; the sum of a and d can be from about 2 to about 10; the sum of b and e can be from about 2 to about 10; c and f can be zero; and the sum of a, b, d, and e can be from about 5 to about 15.

As will be understood by those of skill in the art, employing the currently-known methods for producing colorants conforming to the structure of Formula (I) above and Formula (II) below, as well as other compounds containing a series of repeating units, will produce a polydisperse collection of molecules possessing varying numbers of the repeating units. Thus, for example, if one were to attempt to synthesize a colorant conforming to the structure of Formula (I) in which the sum of a and d is 6, the synthesis would produce a collection of colorant molecules containing some colorant molecules in which the sum of a and d could be as low as 2 and some colorant molecules in which the sum of a and d could be 10 or higher, as well as colorant molecules in which the sum of a and d is any whole number therebetween. However, in the resulting collection, the most common result and median value for the sum of a and d would be 6. Accordingly, as will be understood by those of ordinary skill in the art, the sum values for each of Formula (I) and Formula (II) are, when used to refer to a collection of colorant molecules conforming to the structure or a composition containing such a collection of colorant molecules, intended to refer to the median value for the indicated sum.

The bluing composition concentrate can contain any suitable amount of the primary colorant. The amount of primary colorant present in the bluing composition concentrate should be sufficient to provide, when the concentrate is diluted with water, a bluing agent composition containing an amount of primary colorant sufficient to mask or decrease the visually-perceived yellow coloration of a textile article treated with the composition. However, the amount of primary colorant present in the bluing composition concentrate should not be so high as to produce, when the concentrate is diluted with water, a bluing agent composition that over-hues or stains a textile article treated with the composition. In certain embodiments, the bluing composition concentrate comprises about 0.1 wt. % or more, about 1 wt. % or more, about 5 wt. % or more, or about 10 wt. % or more of the primary colorant, based on the total weight of the bluing composition concentrate. In certain embodiments, the bluing composition concentrate comprises about 20 wt. % or less or about 15 wt. % or less of the primary colorant, based on the total weight of the bluing composition concentrate. Thus, in certain more specific embodiments of the bluing composition concentrate, the concentrate comprises about 0.1 to about 20 wt. %, about 1 to about 15 wt. %, or about 5 to about 10 wt. % of the primary colorant, based on the total weight of the bluing composition concentrate.

As noted above, the bluing composition concentrate can, in certain embodiments, comprise multiple primary colorants. For example, the concentrate can comprise two or more colorants conforming to the structure of Formula (I) above. In such embodiments, each colorant can be present in the concentrate in an amount falling within one of the ranges set forth in the preceding paragraph, or the total amount of colorant present in the concentrate can be within one of the ranges set forth in the preceding paragraph. Preferably, the total amount of colorant in the concentrate (e.g., the total amount of all colorants conforming to the structure of Formula (I) above) is within one of the ranges set forth in the preceding paragraph.

The bluing composition concentrate of the invention can, in certain embodiments, contain one or more secondary colorants in addition to the aforementioned primary colorant. Such secondary colorants can be added to increase the hueing efficiency of a bluing composition made using the concentrate or adjust the aesthetic qualities of the bluing composition concentrate and/or a bluing composition made using the concentrate. In certain embodiments, the bluing composition concentrate can further comprise at least one secondary colorant conforming to the structure of Formula (II):

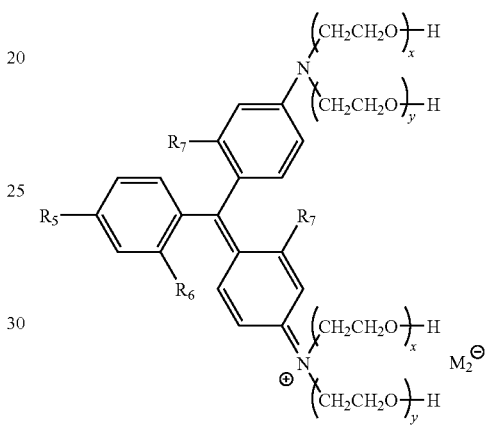

In Formula (II), $R_5$ can be hydrogen or an alkylamine group; $R_6$ can be hydrogen or sodium sulfonate; and $R_7$ can be hydrogen or an alkyl group. The sum of x and y can be from about 3 to about 20; and $M_2$ is a negatively-charged counterion, such as a chloride anion or a sulfate anion. In certain embodiments, $R_5$ can be an alkylamine group; $R_6$ and $R_7$ can be hydrogen; and the sum of x and y can be from about 5 to about 15.

The secondary colorant(s) present in the bluing composition concentrate need not conform to the structure of Formula (II) and need not exhibit a blue or violet shade. For example, the secondary colorant(s) can be selected from the group consisting of dyes, pigments, and other non-staining colorants (e.g., non-staining Liquitint® colorants available from Milliken & Company). Dyes suitable for use as a secondary colorant in the bluing composition concentrate include, but are not limited to, acid dyes, such as C.I. Acid Violet 49 and C.I. Acid Violet 64. Pigments suitable for use as a secondary colorant in the bluing composition include, but are not limited to, ultramarine blue pigments (C.I. Pigment Blue 29).

The bluing composition concentrate can, if present, contain any suitable amount of the above-described secondary colorant(s). As with the primary colorant, the amount of secondary colorant(s) present in the bluing composition concentrate should be sufficient to provide, when the concentrate is diluted with water, the desired effect (e.g., supplement the hueing of the textile article provided by the primary colorant or adjust the aesthetic qualities of the bluing composition concentrate and/or a bluing composition made using the concentrate). However, the amount of primary colorant present in the bluing composition concentration should not be so high as to produce, when the concentrate is diluted with water, a bluing agent composition that over-hues or stains a textile article treated with the composition. In certain embodiments, the bluing composition concentrate comprises about 0.1 wt. % or more, about 1 wt. % or more, about 5 wt. % or more, or about 10 wt. % or more of a secondary colorant, based on the total weight of the bluing composition concentrate. In certain embodiments, the bluing composition concentrate comprises about 20 wt. % or less or about 15 wt. % or less of a secondary colorant, based on the total weight of the bluing composition concentrate. Thus, in certain more specific embodiments of the bluing composition concentrate, the concentrate comprises about 0.1 to about 20 wt. %, about 1 to about 15 wt. %, or about 5 to about 10 wt. % of a secondary colorant, based on the total weight of the bluing composition concentrate.

The primary colorant(s) and, if present, secondary colorant(s) can be present in the bluing composition concentrate in any suitable ratios. In certain embodiments of the invention, such as when the bluing composition concentrate contains a primary colorant conforming to the structure of Formula (I) and a second colorant conforming to the structure of Formula (II), the ratio of the amount of primary colorant (i.e., the colorant conforming to the structure of Formula (I)) to the amount of secondary colorant (i.e., the colorant conforming to the structure of Formula (II)) can be from about 5:1 to about 1:5, about 4:1 to about 1:4, about 3:1 to about 1:3, or about 2:1 to about 1:2 (e.g., about 1:1), based on the weight of each colorant present in the bluing composition concentrate.

As noted above, the bluing composition concentrate is particularly well-suited for use in making bluing compositions for the treatment of textile articles. For example, the bluing composition concentrate can be diluted with an aqueous medium to produce a bluing composition suitable for use as a post-wash rinse for textile articles. In order to produce a bluing composition suitable for such uses, the bluing composition concentrate can, in certain embodiments, contain less than a detersive amount of surfactant(s). In other words, the concentrate can contain less surfactant than is typically present in a detergent composition or an amount of surfactant that, when the concentrate is diluted, produces a bluing composition containing an amount of surfactant that is insufficient to effectively remove soil from the textile article. Thus, in certain embodiments, the bluing composition concentrate contains less than 5 wt. %, less than about 4 wt. %, less than about 3 wt. %, less than about 2 wt. %, less than about 1 wt. %, or less than about 0.5 wt. % of surfactant, based on the total weight of the bluing composition concentrate.

The bluing composition concentrate of the invention can be used to make bluing compositions for the treatment of textile articles. In order to produce a bluing composition, the bluing composition concentrate typically is added to or diluted with an aqueous medium having a volume sufficient to produce a bluing composition containing the desired amount of the colorant(s). For example, if the bluing composition will be used as a post-wash rinse that masks or decreases the visually-perceived yellow coloration of a textile article treated with the composition, the concentrate is added to or diluted with an aqueous medium having a volume sufficient to produce a bluing composition containing an amount of colorant(s) needed to at least partially mask or reduce the visually-perceived yellow coloration of a textile article treated with the bluing composition.

Thus, in another embodiment, the invention provides a method for treating one or more textile articles with a bluing composition. The method generally comprises the steps of: providing one or more textile articles; providing a bluing composition comprising an aqueous medium and at least one colorant conforming to the structure of Formula (I); immersing the textile article in the bluing composition for an amount of time sufficient for the textile article to absorb at least a portion of the bluing composition; removing the textile article from the bluing composition; and drying the textile article.

The method of the invention can be used to treat any suitable textile articles. For example, the method can be used to treat textile articles made from natural fibers (e.g., cotton), synthetic fibers (e.g., polyester and nylon), and combinations of natural and synthetic fibers. The textile article(s) can be any suitable construction, such as woven, knit, or nonwoven. The method of the invention is believed to be particularly well-suited for treating textile articles that are subjected to repeated use and laundering, such as garments, and is believed to be particularly effective in treating articles having a color that is susceptible to yellowing with such repeated use and laundering. For example, the method of the invention is believed to be particularly effective in treating garments that are white.

The bluing composition used in the method comprises an aqueous medium and at least one colorant, such as the primary colorant discussed above. As noted above, the bluing composition used in the method can be produced by adding the above-described bluing composition concentrate to an aqueous medium. The aqueous medium can be any suitable aqueous medium. Thus, in certain embodiments, the bluing composition used in the method comprises an aqueous medium and at least one primary colorant conforming to the structure of Formula (I) above. As with the bluing composition concentrate, the bluing composition can comprise one or more secondary colorants, including colorants conforming to the structure of Formula (II) above, pigments, dyes, and combinations thereof.

The bluing composition used in the method can comprise any suitable amount of the primary colorant(s). The amount of primary colorant present in the bluing composition should be sufficient to mask or decrease the visually-perceived yellow coloration of a textile article treated with the composition. However, the amount of primary colorant present in the bluing composition should not be so high as to over-hue or stain a textile article treated with the composition. In certain embodiments, the bluing composition comprises about 0.5 ppm or more, about 1 ppm or more, or about 5 ppm or more of the primary colorant, based on the total weight of the bluing composition. In certain embodiments, the bluing composition comprises about 20 ppm or less, about 15 ppm or less, or about 10 ppm or less of the primary colorant, based on the total weight of the bluing composition. Thus, in certain more specific embodiments of the bluing composition, the comprises about 0.5 to about 20 ppm, about 1 to about 15 ppm, or about 5 to about 10 ppm of the primary colorant, based on the total weight of the bluing composition.

The bluing composition used in the method of the invention can, if present, contain any suitable amount of the above-described secondary colorant(s). As with the primary colorant(s), the amount of secondary colorant(s) present in the bluing composition should be sufficient to provide the desired effect (e.g., supplement the hueing of the textile article provided by the primary colorant or adjust the aesthetic qualities of the bluing composition). However, the amount of primary colorant present in the bluing composition should not be so high as to over-hue or stain a textile article treated with the composition. In certain embodiments, the bluing composition comprises about 0.5 ppm or more, about 1 ppm or more, or about 5 ppm or more of a secondary colorant, based on the total weight of the bluing composition. In certain embodiments, the bluing composition comprises about 20 ppm or less, about 15 ppm or less, or about 10 ppm or less of a secondary colorant, based on the total weight of the bluing composition. Thus, in certain more specific embodiments of the bluing composition, the comprises about 0.5 to about 20 ppm, about 1 to about 15 ppm, or about 5 to about 10 ppm of a secondary colorant, based on the total weight of the bluing composition.

The primary colorant(s) and, if present, secondary colorant(s) can be present in the bluing composition in any suitable ratios. In certain embodiments of the invention, such as when the bluing composition used in the method contains a primary colorant conforming to the structure of Formula (I) and a second colorant conforming to the structure of Formula (II), the ratio of the amount of primary colorant (i.e., the colorant conforming to the structure of Formula (I)) to the amount of secondary colorant (i.e., the colorant conforming to the structure of Formula (II)) can be from about 5:1 to about 1:5, about 4:1 to about 1:4, about 3:1 to about 1:3, or about 2:1 to about 1:2 (e.g., about 1:1), based on the weight of each colorant present in the bluing composition.

The method of the invention is believed to be particularly well-suited for the post-wash treatment of textile articles. In such post-wash treatments, the purpose of the treatment is not to clean the textile article in the same manner as a wash cycle or treatment and, therefore, the initial post-wash treatment bath typically contains very little surfactant. The relatively low amount of surfactant initially present in the treatment bath allows for the removal of residual surfactant (e.g., surfactant remaining from the wash cycle or treatment) from the textile article. This residual surfactant can contribute to the increased soiling of the textile article during subsequent use and can also deleteriously affect the tactile qualities of the textile article. Thus, the bluing composition used in the method of the invention can, in certain embodiments, initially contain less than a detersive amount of surfactant(s). In other words, the bluing composition can initially contain less surfactant than is typically present in a bath used to wash textile articles or an amount of surfactant that is insufficient to effectively remove soil from the textile article. Thus, in certain embodiments, the bluing composition initially contains less than 25 ppm, less than about 20 ppm, less than about 15 ppm, less than about 10 ppm, or less than about 5 ppm of surfactant, based on the total weight of the bluing composition. As will be understood by those of ordinary skill in the art, the foregoing amounts for the surfactant content refer to the amount of surfactant present in the bluing composition before the addition of the textile article(s). Thus, the amount of surfactant present in the bluing composition may increase as any residual surfactant is removed from the textile articles and is dissolved or suspended in the bluing composition.

In order to deposit at least a portion of the colorant(s) onto the textile article(s), the method includes the step of immersing the textile article(s) in the bluing composition. The textile article can be immersed in the bluing composition for any suitable amount of time. Typically, the textile article(s) is immersed in the bluing composition for an amount of time sufficient for the textile article(s) to absorb at least a portion of the bluing composition. Thus, when the textile article(s) is removed from the bluing composition and subsequently dried, at least a portion of the colorant(s) in the bluing composition remain deposited on the textile article(s), where the colorant(s) is able to decrease or mask the visually-perceived yellow coloration of the textile article(s) that would occur with repeated use and laundering.

The textile article(s) treated in accordance with the method of the invention can be dried by any suitable means. For example, the textile article(s) can be passively dried in the open air (e.g., on a clothes line or in the sunlight) or the textile article(s) can be actively dried in a clothes dryer.

The method of the invention can be carried out in any suitable apparatus or environment. For example, the steps of the method can be performed in a clothes washing machine, with the step of drying being performed by the passive and/or active means described above. In particular, the method described above can be performed during the rinse cycle of a typical clothes washing machine by adding, either manually or automatically, the appropriate colorant(s)—or a product or concentrate containing the appropriate colorant(s)—to the water added during the rinse cycle, thereby producing the bluing composition called for in the method. Alternatively, the steps of the method can be performed by hand in an appropriate container (e.g., wash tub) and dried by one of the means described above.

As noted above, the bluing concentrate, bluing composition, and method of the invention are believed to be particularly well-suited to the treatment of textile articles, especially those textile articles that are repeatedly laundered using typical household laundry conditions. Under such conditions, it is believed that the bluing concentrate, bluing composition, and method of the invention will not build-up on the articles to such a degree as to result in excessive bluing or over-hueing of the textile articles with repeated use. While not wishing to be bound to any particular theory, Applicants believe that this behavior is due, at least in part, to the structure of the colorants and their "polymeric" nature (i.e., a structure containing several repeating groups forming a chain attached to the chromophore). In particular, for those colorants conforming to the structure of Formulae (I) and (II), Applicants believe that this behavior is due, at least in part, to the instability of the triphenylmethane colorants under the alkaline conditions used in typical household laundering processes. This lack of stability leads to the decomposition of at least a portion of the colorant(s) deposited on the textile article, thereby reducing the amount of residual colorant(s) on the textile article and reducing the tendency for the colorant(s) to build-up with repeated use.

The following examples further illustrate the subject matter described above but, of course, should not be construed as in any way limiting the scope thereof.

EXAMPLE 1

This example demonstrates the deposition characteristics of bluing compositions according to the invention. The CIELAB $b^*$ values of several samples of white cotton fabric and white polyester fabric were measured using a spectrophotometer. The samples of white cotton fabric and white polyester fabric were then immersed bluing compositions according to the invention and allowed to soak for approximately 1 minute. The samples were then line dried indoors, and the $b^*$ values of the samples were then measured again. The $b^*$ value before treatment and the $b^*$ value after treatment were then used to calculate a change in $b^*$ value (i.e., $\Delta b^*$) resulting from the treatment with the bluing composition according to the invention. In particular, the $\Delta b^*$ values were calculated by subtracting the $b^*$ value before treatment ($b^*_{initial}$) from the $b^*$ value after treatment ($b^*_{final}$) (i.e., $\Delta b^* = b^*_{final} - b^*_{initial}$). A decrease in the $b^*$ value (i.e., a negative $\Delta b^*$) indicates that the treated fabric exhibits more of a blue color, which is attributable to deposition of the colorant(s) from the bluing composition.

Sixteen fabric samples (Samples 1A-1P) were treated and tested in accordance with the general procedure outlined above. Samples 1A-1H were treated with a bluing composition containing a colorant conforming to the structure of Formula (I). Samples 1I-1P were treated with a bluing composition containing equal parts (by weight) of a colorant conforming to the structure of Formula (I) and a colorant conforming to the structure of Formula (II). The colorant conforming to Formula (I) used in treating Samples 1I-1P is the same as colorant used in treating Samples 1A-1H. The cloth type (i.e., cotton or polyester), the total colorant concentration in the bluing composition ("colorant concentration"), and the Δb* values for the samples are reported in Table 1 below.

TABLE 1

Cloth type, colorant concentration, and Δb* values for Samples 1A-1P.

| Sample | Cloth Type | Colorant Concentration (ppm) | Δb* |
| --- | --- | --- | --- |
| 1A | cotton | 1 | −4.43 |
| 1B | cotton | 5 | −11.02 |
| 1C | cotton | 10 | −13.54 |
| 1D | cotton | 20 | −19.47 |
| 1E | polyester | 1 | −9.48 |
| 1F | polyester | 5 | −19.06 |
| 1G | polyester | 10 | −21.59 |
| 1H | polyester | 20 | −23.63 |
| 1I | cotton | 1 | −4.01 |
| 1J | cotton | 5 | −11.44 |
| 1K | cotton | 10 | −13.32 |
| 1L | cotton | 20 | −18.12 |
| 1M | polyester | 1 | −7.55 |
| 1N | polyester | 5 | −16.44 |
| 1O | polyester | 10 | −17.08 |
| 1P | polyester | 20 | −21.74 |

As can be seen from the Δb* values for Samples 1A-1P, the bluing compositions according to the invention exhibit relatively good colorant deposition on both cotton and polyester fabrics, which are two of the most common fabric types. The decrease in b* values (i.e., negative Δb* values) indicates that the treated fabrics exhibit more of a blue color than the untreated fabric. This "bluing" of the treated cloth is believed to counteract any yellowing of the fabric that would naturally occur with repeated use and/or laundering.

EXAMPLE 2

This example compares bluing compositions according to the invention with other commercially-available bluing compositions used in the treatment of laundry. Six samples (Sample 2A, Sample 2B, and Comparative Samples 1-4) were treated with different bluing compositions in accordance with the general procedure outlined in Example 1. The only departure from the general procedure set forth in Example 1 was that a portion of each sample was line dried indoors and a separate portion of each sample was dried outdoors under direct exposure to sunlight for approximately three (3) hours. This was done to simulate the various drying methods employed and to determine the lightfastness of the different bluing compositions used.

Sample 2A, which was a white cotton fabric, and Sample 2B, which was a white polyester fabric, were treated with bluing compositions containing equal parts (by weight) of a colorant conforming to the structure of Formula (I) and a colorant conforming to the structure of Formula (II). The total concentration of colorants in the bluing compositions used to treat Samples 2A and 2B was 10 ppm. Comparative Sample 1, which was a white cotton fabric, and Comparative Sample 3, which was a white polyester fabric, were treated with a bluing composition made using Ujala liquid fabric whitener (available from Jyothy Laboratories Limited) at a concentration of 0.27 grams per liter of water. Comparative Sample 2, which was a white cotton fabric, and Comparative Sample 4, which was a white polyester fabric, were treated with a bluing composition made using Robin Blue powder (available from R&C) at a concentration of 0.27 grams per liter of water. The b* value before treatment and the b* value after treatment under each drying condition were then used to calculate a change in b* value (i.e., Δb*) resulting from the treatment with the respective bluing composition. For each sample, the difference between the Δb* values resulting from the indoor drying condition ("indoor Δb*") and the outdoor drying condition ("outdoor Δb*") were then used to calculate a change in the Δb* that is believed to be attributable to the exposure to sunlight ("Δb* loss"). The Δb* loss, which is expressed as a percentage, is calculated by subtracting the outdoor Δb* from the indoor Δb*, dividing the result by the indoor Δb*, and multiplying by 100%. The indoor Δb*, outdoor Δb*, and Δb* loss for each of Sample 2A, Sample 2B, and Comparative Samples 1-4 are set forth in Table 2 below.

TABLE 2

Indoor Δb*, outdoor Δb*, and Δb* loss for Sample 2A, Sample 2B, and Comparative Samples 1-4

| Sample | Indoor Δb* | Outdoor Δb* | Δb* loss (%) |
| --- | --- | --- | --- |
| 2A | −13.32 | −9.26 | 30.5 |
| Comparative 1 | −10.36 | −5.61 | 45.8 |
| Comparative 2 | −13.13 | −6.54 | 50.2 |
| 2B | −17.08 | −10.48 | 38.6 |
| Comparative 3 | −11.09 | −3.04 | 72.6 |
| Comparative 4 | −13.43 | −3.49 | 74.0 |

As can be seen from the results set forth in Table 2, the fabrics treated with bluing compositions according to the invention (Samples 2A and 2B) exhibited higher Δb* values than the fabrics treated with commercially-available bluing agents, especially under the outdoor drying conditions. Also, the Δb* loss values for the fabrics treated with bluing compositions according to the invention (Samples 2A and 2B) were significantly lower than the Δb* loss values exhibited by the fabrics treated with commercially-available bluing agents. This data suggests that the bluing compositions according to the invention exhibit greater lightfastness than the commercially-available bluing agents.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A bluing composition concentrate comprising:
  (a) an aqueous medium; and
  (b) about 0.1 wt. % to about 20 wt. % of at least one colorant conforming to the structure of Formula (I) below:

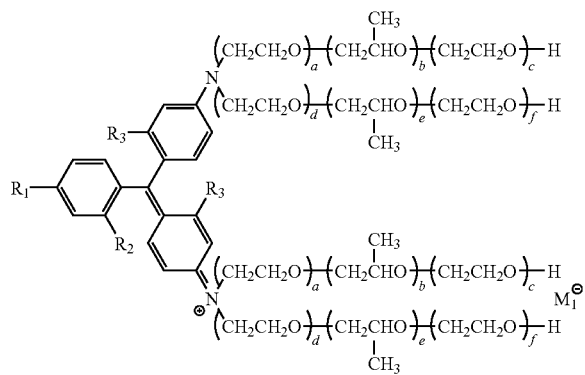

wherein $R_1$ is hydrogen or an alkylamine group; $R_2$ is hydrogen or sodium sulfonate; $R_3$ is hydrogen or an alkyl group; the sum of a and d is from about 2 to about 20; the sum of b and e is from about 2 to about 10; the sum of c and f is from about 0 to about 20; and the sum of a, b, c, d, e, and f is from about 4 to about 30; and $M_1$ is a negatively-charged counterion;

wherein the concentrate comprises less than a detersive amount of surfactant.

2. The bluing composition concentrate of claim 1, wherein $R_1$ is an alkylamine group; $R_2$ and $R_3$ are hydrogen; the sum of a and d is from about 2 to about 10; the sum of b and e is from about 2 to about 10; c and f are zero; and the sum of a, b, d, and e is from about 5 to about 15.

3. The bluing composition concentrate of claim 1, wherein $M_1$ is a chloride anion or a sulfate anion.

4. The bluing composition concentrate of claim 1, wherein the concentrate further comprises about 0.1 wt. % to about 20 wt. % of at least one colorant conforming to the structure of Formula (II) below:

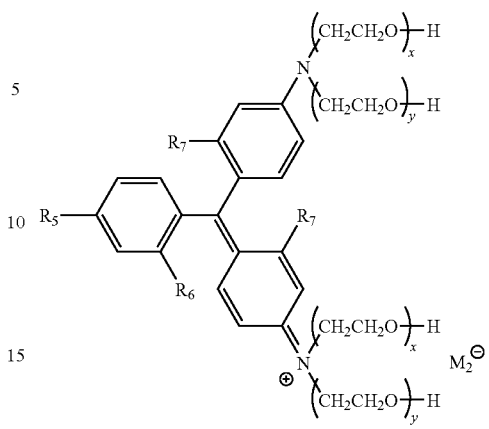

wherein $R_5$ is hydrogen or an alkylamine group; $R_6$ is hydrogen or sodium sulfonate;

$R_7$ is hydrogen or an alkyl group; the sum of x and y is from about 3 to about 20; and $M_2$ is a negatively-charged counterion.

5. The bluing composition concentrate of claim 4, wherein $R_5$ is an alkylamine group; $R_6$ and $R_7$ are hydrogen; and the sum of x and y is from about 5 to about 15.

6. The bluing composition concentrate of claim 4, wherein $M_2$ is a chloride anion or a sulfate anion.

7. The bluing composition concentrate of claim 1, wherein the concentrate comprises about 1 wt. % to about 15 wt. % of at least one colorant conforming to the structure of Formula (I).

8. The bluing composition concentrate of claim 4, wherein the concentrate comprises about 1 wt. % to about 15 wt. % of at least one colorant conforming to the structure of Formula (II).

9. A method for treating a textile article, the method comprising the steps of:
  (a) providing one or more textile articles,
  (b) providing a bluing composition comprising:
    (i) an aqueous medium, and
    (ii) at least one colorant conforming to the structure of Formula (I) below:

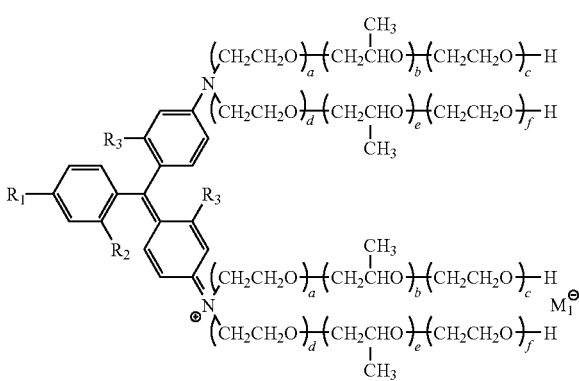

wherein $R_1$ is hydrogen or an alkylamine group; $R_2$ is hydrogen or sodium sulfonate; $R_3$ is hydrogen or an alkyl group; the sum of a and d is from about 2 to about 20; the sum of b and e is from about 2 to about 20; the sum of c and f is from about 0 to about 20; and the sum of a, b, c, d, e, and f is from about 4 to about 30; and $M_1$ is a negatively-charged counterion;

wherein the bluing composition comprises less than a detersive amount of surfactant;

(c) immersing the textile article in the bluing composition for an amount of time sufficient for the textile article to absorb at least a portion of the bluing composition;

(d) removing the textile article from the bluing composition; and (e) drying the textile article.

10. The method of claim 9, wherein $R_1$ is an alkylamine group; $R_2$ and $R_3$ are hydrogen; the sum of a and d is from about 2 to about 10; the sum of b and e is from about 2 to about 10; c and f are zero; and the sum of a, b, d, and e is from about 5 to about 15.

11. The method of claim 9, wherein $M_1$ is a chloride anion or a sulfate anion.

12. The method of claim 9, wherein the bluing composition comprises about 0.5 ppm to about 20 ppm of at least one colorant conforming to the structure of Formula (I).

13. The method of claim 9, wherein the bluing composition further comprises at least one colorant conforming to the structure of Formula (II) below:

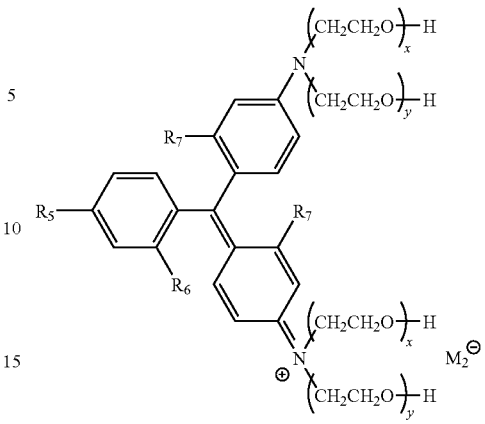

wherein $R_5$ is hydrogen or an alkylamine group; $R_6$ is hydrogen or sodium sulfonate; $R_7$ is hydrogen or an alkyl group; the sum of x and y is from about 3 to about 20; and $M_2$ is a negatively-charged counterion.

14. The method of claim 13, wherein $R_5$ is an alkylamine group; $R_6$ and $R_7$ are hydrogen; and the sum of x and y is from about 5 to about 15.

15. The method of claim 13, wherein $M_2$ is a chloride anion or a sulfate anion.

16. The method of claim 13, wherein the bluing composition comprises about 0.5 ppm to about 20 ppm of at least one colorant conforming to the structure of Formula (II).

* * * * *